(12) United States Patent
Herschbach (10) Patent No.: US 9,528,819 B2
(45) Date of Patent: Dec. 27, 2016

(54) SPATIALLY SELECTIVE DETECTION USING A DYNAMIC MASK IN AN IMAGE PLANE

(71) Applicant: IEE INTERNATIONAL ELECTRONICS & ENGINEERING S.A., Echternach (LU)

(72) Inventor: Norbert Herschbach, Medernach (LU)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 14/351,607

(22) PCT Filed: Oct. 15, 2012

(86) PCT No.: PCT/EP2012/070433
§ 371 (c)(1),
(2) Date: Apr. 14, 2014

(87) PCT Pub. No.: WO2013/053952
PCT Pub. Date: Apr. 18, 2013

(65) Prior Publication Data
US 2014/0240721 A1    Aug. 28, 2014

(30) Foreign Application Priority Data
Oct. 14, 2011 (LU) .......................................... 91887

(51) Int. Cl.
*G01B 11/24* (2006.01)
*G01B 11/02* (2006.01)
(Continued)

(52) U.S. Cl.
CPC ............. *G01B 11/02* (2013.01); *G01C 15/002* (2013.01); *G01S 7/487* (2013.01); *G01S 7/4816* (2013.01);
(Continued)

(58) Field of Classification Search
CPC ....... G01B 11/02; G01B 11/24; G01B 11/005; G01C 15/002; G01S 7/4817
(Continued)

(56) References Cited

U.S. PATENT DOCUMENTS 6,044,170 A * 3/2000 Migdal .............. G01B 11/2518
250/559.23
9,041,903 B2 * 5/2015 Nelson ............................ 355/30
(Continued)

FOREIGN PATENT DOCUMENTS

DE    102005049471    5/2007
DE    102008021465    11/2009
(Continued)

OTHER PUBLICATIONS

Translation of DE102005049471 (A1), 7 pages, Spies et al, May 31, 2007.*
(Continued)

*Primary Examiner* — Hoa Pham
(74) *Attorney, Agent, or Firm* — Reising Ethington P.C.

(57) ABSTRACT

A three-dimensional laser scanner instrument for acquiring three-dimensional geometric data of a scene (1) comprises an illumination system (3) for generating a light beam (2) and for scanning an illumination point of said light beam (2) through said scene (1), a light detection system (6-9) comprising at least one light detector (8), said light detection system being arranged to receive light from said scene (1), and an optical system (4) for imaging light scattered in or reflected from said scene (1) onto said light detection system (6-9). The light detection system (6-9) further comprises a controllable filter element (6) for dynamically discriminating light impinging from selected regions of said scene (1) and a control unit (9) operatively connected to said controllable filter element (6) and to said illumination system (3),
(Continued)

wherein in operation of said scanner instrument, said filter element (6) is controlled by said control unit (9) so as to guide only light impinging from a selected, spatially delimited region around said illumination point in said scene (1) onto said at least one light detector (8).

13 Claims, 3 Drawing Sheets

(51) Int. Cl.
| | |
|---|---|
| *G01S 17/00* | (2006.01) |
| *G01S 17/42* | (2006.01) |
| *G01S 17/89* | (2006.01) |
| *G01S 7/481* | (2006.01) |
| *G01S 7/487* | (2006.01) |
| *G02B 26/02* | (2006.01) |
| *G01C 15/00* | (2006.01) |
| *G02B 26/08* | (2006.01) |

(52) U.S. Cl.
CPC ............ *G01S 7/4817* (2013.01); *G01S 17/003* (2013.01); *G01S 17/42* (2013.01); *G01S 17/89* (2013.01); *G02B 26/023* (2013.01); *G02B 26/0833* (2013.01)

(58) Field of Classification Search
USPC .................................................. 356/601–623
See application file for complete search history.

(56) References Cited

U.S. PATENT DOCUMENTS

| | | | |
|---|---|---|---|
| 2006/0227317 | A1 | 10/2006 | Henderson et al. |
| 2007/0165246 | A1* | 7/2007 | Kimmel ............. G01B 11/2513 356/610 |
| 2010/0220988 | A1* | 9/2010 | Ohno ....................... G03B 9/40 396/242 |
| 2014/0187967 | A1* | 7/2014 | Wood .................. A61B 5/0071 600/473 |

FOREIGN PATENT DOCUMENTS

| | | |
|---|---|---|
| WO | 2011117206 A1 | 9/2011 |
| WO | 2011144454 A1 | 11/2011 |
| WO | 2012013536 A1 | 2/2012 |
| WO | 2012034881 A1 | 3/2012 |

OTHER PUBLICATIONS

International Search Report for corresponding application PCT/EP2012/070433 filed Oct. 15, 2012; Mail date Feb. 22, 2013.

J. Wolfe, "Polarmatric Characterization of Liquid-Crystal-on-Silicon Panels", Applied Optics, Optical Society of America, vol. 45, No. 8, Mar. 10, 2006, pp. 1688-1703, XP001241158.

Written Opinion for corresponding application PCT/EP2012/070433 filed Oct. 15, 2012; Mail date Feb. 22, 2013.

* cited by examiner

SPATIALLY SELECTIVE DETECTION USING A DYNAMIC MASK IN AN IMAGE PLANE

TECHNICAL FIELD

The present invention generally relates to the area of three-dimensional laser scanners, i.e. instruments which acquire three-dimensional geometric data of a scene of objects by sequentially pointing a pulsed or modulated laser beam at different points in the scene and detecting the light backscattered from a scene object with a resolution in time allowing to determine the distance to the scene object by the time-of-flight method. The invention more particularly applies to LADAR, LIDAR, laser ranging and/or three-dimensional laser scanners.

BACKGROUND ART

Many different designs of three-dimensional laser scanner instruments exist. Some of these instruments reach a very high precision, but can require precise alignment and long measurement times. Many possible applications for such instruments are conceivable in consumer products, when both costs and the degree of complication of their operation can be reduced.

Although concepts exist for LIDAR imagers which avoid mechanical actuation of optical elements to steer illumination light beams and to collect the light scattered in the scene (such as disclosed e.g. in PCT application PCT/EP2011/065267), designs using mechanically moving optical elements (such as disclosed e.g. in WO2011/117206, PCT/EP/2011/057192 or PCT/EP2011/062314) are widespread. Typically today's commercial laser scanner devices relying on mechanical systems to scan the laser beam use gimbal-mounted mirrors, rotating reflectors, or counter-rotating prism pairs. This leads to rather voluminous, often noisy and expensive instruments.

In scanner devices which use the same light path for detection as for illumination, increasing the optical aperture for detection to improve the light gathering ability of the system means the same increase in aperture of the optical elements in the illumination path, where it is typically not required. Since size and weight of the optical elements increases accordingly, this can result in even more cumbersome constructions and sluggish performance when the laser beam is scanned by mechanical actuation of optical elements.

For this and other reasons, like improved capabilities in foggy or dusty situations, separate light paths for illumination and detection are preferable. When the optical system responsible for the scan of the illumination beam can be designed without restrictions regarding the detection of the light scattered in the scene, compacter and faster designs using for example micro-electro-mechanical-system (MEMS) technology, optical fiber technology with miniaturized optics and actuators become possible.

Lateral spatial selectivity in the detection process is naturally given to a certain extend in systems with partially overlapping light paths for illumination and detection. Using separate light paths for illumination and detection gives the freedom to design both light pathways in a way optimized to their respective purpose, but a lateral spatial selectivity in the detection has to be provided for separately. When detector arrays such as CCD, CMOS or micro-bolometer sensors can be used, lateral resolution is readily given and most functionalities described for this invention can be implemented by software processing of the acquired image data.

The present invention is particularly valuable for scanner systems which offer very little or no transversal resolution and selectivity by the light detector itself as is the case when a single detector element is used. Reasons for this can be the increased sensitivity and/or time resolution of single detectors as compared to CCD, CMOS or micro-bolometer detector arrays, as well as cost considerations and availability at the working wavelength.

BRIEF SUMMARY

The invention provides for an improved three-dimensional laser scanner system.

A lens or a more complex optical system images the scene which is scanned by the illumination laser beam. In the image plane of this lens or optical system a device selects a region of interest (ROI) of variable shape and size which is continuously repositioned and adapted such that mainly the image of the illuminated spot is captured within the ROI. The shape and size of the ROI can be adapted continuously as the illumination beam scans over the scene. The device realizing the selection of the ROI separates all light paths lying inside the ROI from those lying outside the ROI, such that the light from inside the ROI can be detected separately.

For improved prevention of interference between several similar three-dimensional scanners working on the same scene sufficient diversification of the laser beam scan path and/or the time sequence of the laser pulses used in each device can be achieved by using random or pseudo-random sequences. In addition, methods for self-alignment or automatic optimization of the alignment of the ROI selection device and possibly parts of the lens or imaging system with respect to beam pointing of the scanning laser can be implemented to assure good performance of the system. Also methods for discriminating geometrically between light scattered from the scene object and light scattered from fog, dust, or smoke using perspective geometry and the time-of-flight spectrum of the detected light, or iterative adaptation of the ROI are pointed out. These methods are also used to determine the visibility range under bad atmospheric conditions.

In accordance with one aspect of the present invention, a three-dimensional laser scanner instrument for acquiring three-dimensional geometric data of a scene comprises an illumination system for generating a light beam and for scanning an illumination point of said light beam through said scene, a light detection system comprising at least one light detector, said light detection system being arranged to receive light from said scene, and an optical system for imaging light scattered in or reflected from said scene onto said light detection system. According to the invention, said light detection system comprises a controllable filter element for dynamically discriminating light impinging from selected regions of said scene and a control unit operatively connected to said controllable filter element and to said illumination system, wherein in operation of said scanner instrument, said filter element is controlled by said control unit so as to guide only light impinging from a selected, spatially delimited region around said illumination point in said scene onto said at least one light detector.

In a preferred embodiment of the invention, a size and/or a shape of said selected, spatially delimited region around said illumination point is dynamically adjustable. Adaptations of the position, the size and the shape of the region selecting light for detection are preferably done in order to improve signal-to-noise ratio, or to facilitate tracking of the illumination spot, or to facilitate calibration procedures for a deterministic tracking of the illumination spot or to provide additional functionality like improved detection of objects in situations of bad atmospheric conditions.

The selection of the light for detection occurs preferably geometrically in or close to the image plane of an optical system which collects the light from the scene. Accordingly said filter element is preferably arranged geometrically in or close to an imaging plane of said optical system.

It will be noted that the three-dimensional laser scanner instrument may be configured to use the same light path for detection as for illumination. However for the above mentioned reasons, it is currently preferred that the scanner instrument uses separate light paths for illumination and detection. In this case said light beam is projected onto said scene along a first optical pathway and said light scattered in or reflected from said scene is imaged onto said light detection system along a second optical pathway, and said first pathway and said second pathway are separate from each other.

The controllable filter element may be of any suitable configuration for selectively guiding light from well-defined and limited regions of the scene onto the detector. In a first embodiment, said controllable filter element comprises one or more mechanical diaphragm blade(s) of appropriate shape(s), said one or more mechanical diaphragm blade(s) being provided with an electronically controlled mechanical actuation device. Alternatively said controllable filter element comprises at least one liquid crystal panel, said liquid crystal panel comprising an array of individually controllable pixels to control blocking and transmission of light in different areas of said panel.

In yet another embodiment said controllable filter element comprises at least one panel based on LCoS (liquid crystal on silicon) technology comprising an array of individually controllable pixels and a polarization selective optical element, such as a polarization beam splitter. In this embodiment, the separation of the light selected for detection from background light is achieved by the change of the polarization state in combination with polarization selective optical elements like a polarization beam splitter.

Finally the controllable filter element may also comprise an array of micromechanical mirrors, said micromechanical mirrors being arranged and configured such that the orientation of said micromechanical mirrors with respect to the image plane can be individually switched. This technology is also known as DLP technology (Digital Light Processing).

The controllable filter element or detection region selection device is preferably electronically controlled and automatically steered using geometric parameters of the system, such that the image of the illuminated spot is always captured within the detection region. An increased precision can be achieved by using the time-of-flight information to narrow down the detection region in repeated measurements. The detection region selection device is advantageously fully controlled by microprocessor, ASICs or other control electronics.

While the illumination beam scans the object scene the control unit ensures the coordination between laser scan unit and the detection region selection device in order to reposition and adapt the region selected for detection, such that mainly the image of the illuminated spot is always captured within the detection region. For this the fixed geometrical relationship between the deflection angles used by the scan unit, the coordinates in the image plane of the imaged laser spot on a scene object and the distance between this object spot and the detection unit is used. The geometric relationship mapping illuminated points in the three-dimensional scene to points in the image plane of the imaging lens is preferably represented in the computerized control unit by corresponding computable expressions with parameters characterizing the details of the instrument's geometry, i.e. distances and angles, and possibly response calibration factors for the device realizing the illumination beam deflection as well as the magnification of the imaging lens.

The control unit either drives also the illumination beam scan unit or it obtains the necessary information on the laser deflection angles actually used. Also without the object distance information the region in the image plane, in which the image of the illuminated spot can appear, is well defined and selective detection of the light from this region enables substantial suppression of background signal. The distance between the illuminated spot in the object scene and the detection unit is obtained accurately from the time-of-flight measurement and can be used to further narrow down the detection region and thus increase the precision in repeated measurements. The detection region selection device can also be used to restrict measurements to a specific distance range.

The geometrical relationship governing the coordination of the controllable filter or ROI-selection device with the drive of the illumination beam deflection angles in the scan unit depends on the details of the actual geometry of the scanner construction. The instrument is often exposed to temperature changes, mechanical stress, vibration and chock, so that frequent alignment and calibration of the system is required. In a preferred embodiment, the three-dimensional laser scanner instrument therefore preferably comprises a calibration mechanism configured and adapted to calibrate and align the controllable filter element with the light beam generated by said illumination system. The instrument is e.g. fit additionally with accelerometer sensors, temperature sensors and actuators for optical components as well as control loop electronics to achieve active vibration control and self-alignment of the instrument. In order to compensate the effects of vibrations and mechanical stress static and dynamic accelerations may be measured using accelerometers at relevant locations within the instrument. The control signals obtained from automatic evaluation of the sensor data are driving actuators of optical elements within the detection unit, mirrors and lenses within the imaging lens or the auxiliary lens systems, and/or the detection region selection device, as well as the optical components of the laser beam scan unit. Temperature measurements at different locations within the instrument can be evaluated to compensate changes in the geometry of the system due to temperature changes. In addition or alternatively the control signals from accelerometers and temperature sensors can be evaluated in the unit controlling the detection region selection device in order to account in the steering of this device for changes in the systems geometry, positions of elements in the detection system as well as changes in angles or position of the illumination beam. Similarly the steering of the deflection angles for the laser beam scan can be included into the control loop to correct for changes due to vibration and mechanical stress or temperature change.

The installation preferably uses methods for automatic calibration of the parameters determining the geometry of the system which are required for mapping the position of the image of an illuminated scene object spot in the image plane of the optical system for detection to the illumination beam deflection angles and vice-versa, when the object distance is known. To localize the image of the illuminated object scene spot in the image plane of the imaging lens iterative search procedures are employed using the detection region selection device. Starting with a larger detection region containing image of the illuminated spot, the region's area is gradually decreased and repositioned such that it contains the image of the illuminated spot. Additionally segmented photo-detectors, e.g. quadrant photo-detectors, can be employed to facilitate fast convergence of the localization procedure. The time-of-flight measurement gives the distance to the object spot in the scene with which the geometry is completely determined and an updating of relevant geometric parameters of the system can be achieved.

The present invention also relates to a method for operating a three-dimensional laser scanner instrument, said three-dimensional laser scanner instrument comprising an illumination system for generating a light beam and for scanning an illumination point of said light beam through said scene, a light detection system comprising at least one light detector, said light detection system being arranged to receive light from said scene, and an optical system for imaging light scattered in or reflected from said scene onto said light detection system. In accordance with the spirit of the invention the method comprises the steps of dynamically discriminating light impinging from selected regions of said scene by means of controllable filter element by controlling said filter element so as to guide only light impinging from a selected, spatially delimited region around said illumination point in said scene onto said at least one light detector.

In preferred embodiments of the invention said controllable filter element is controlled for blocking of return light signal from atmospheric scattering at short range during the operation of the instrument under bad atmospheric conditions, e.g. fog. This enables the efficient use of the dynamic range of the light detector for sensitive detection of objects in larger distance, i.e. it prevents overloading of the light detector with a large signal contribution from short range atmospheric scattering.

The visibility range in bad atmospheric conditions is preferably determined based on an evaluation light intensity distribution in the image of the trace of the laser beam due to light scattering in the atmosphere. The light intensity distribution over the image of the light scattered along the probe beam in the atmosphere is obtained using the detection region selection device described in claim 1 and varying the position and/or the shape and/or the area of the detection region in consecutive measurements.

In further embodiments of the invention, the instrument is capable of measuring the time-of-flight spectrum of the return light, which is further processed to distinguish diffuse atmospheric scattering from object scattering; to determine the visibility range from the atmospheric scattering signal component; and to perform sensitive detection of scene objects under bad atmospheric conditions by excluding strong atmospheric scattering signal from short range using the controllable filter element and gradually increases the distance from which on the detection is active and adapts illumination pulse energy and/or detector gain. During the operation of the instrument under bad atmospheric conditions the measurement of the time-of-flight spectrum and a subsequent automatic analysis enables to distinguish between signal contributions from atmospheric scattering and signal contributions from scene objects and to quantify visibility. The signal contribution from atmospheric scattering is identifiable by its characteristic shape as a function of time, a broad feature decreasing like the exponential function divided by time squared. The characteristic signature of a signal contribution stemming from a scene object is that as a function of time it matches closely the shape of the illumination pulse. In a first measurement using a low detector gain and/or a low illumination pulse energy and with the detection region selection device set to allow detection over the entire distance range, the time-of-flight spectrum can be used to deduce an accurate estimate for the visibility range and to detect possible scene objects in small distance. To gauge visibility the attenuation coefficient in the exponential function factor fitting the shape of the time-of-flight signal contribution from atmospheric scattering is determined. In subsequent measurements intended to probe the scene for more distant objects the detection region selection device is steered to transmit light for detection from gradually larger distance while blocking light from shorter distance and the previously determined visibility is used to estimate the required illumination pulse energy and/or light detector gain.

A procedure to optimize the detected optical return signal while ensuring best suppression of signal stemming from the region outside of the illuminated spot may be performed by a search for the maximum in return light pulse signal during iterative variation of the area and shape of the region in the image plane selected for detection by the controllable filter element with the additional constraint, that the area of the selected region is at a minimum without reducing the return signal level significantly.

Finally a method to minimize the probability for incidents of interference between two or more three-dimensional scanner devices working on the same scene may be implemented by restricting the detection of return light from the illumination pulse geometrically to the illuminated spot in the scene using a device selecting the corresponding region in the image plane of the imaging lens as described hereinabove, together with the control electronics and methods for tracking the illuminated spot, and possibly the optimization procedure described in above for keeping the area of the region of the illuminated spot selected for detection as small as possible. It is further ensured that an overlapping of illumination points in the scene together with a coincidence of illumination pulses in time of two or more systems can only occur in isolated events by a diversification of the illumination pulse timing and/or of the scan path of the laser spot using random sequences. The random sequences for this can be obtained from pseudo-random generators using as seed numbers a truly random source, such as a hardware random number generator, or numbers derived from values obtained from sensors measuring environmental parameters like ambient light intensity or temperature The invention solves several problems in applications of three-dimensional laser scanners: a) it enables improved blocking of background and stray light prior to the detection process while a larger optical aperture for signal collection can be chosen; b) it enables methods to avoid interference (collisions) with other similar scanner systems which possibly illuminate the same scene at the same time; and c) it provides for single detector systems functionality common with array detectors such as to discriminate geometrically between the signal contribution from light scattering off an object in the scene and those contributions from scattered light of the laser beam due to fog, dust, smoke or insects before the beam hits the scene object, which becomes possible in combination with analysis of the time behaviour of the detected signal in repeated measurements.

Problem a): The sun and other background light sources contribute light at the wavelength of the scanner's laser, which, together with stray light from the illumination system itself and other sources, adds to the possibly weak signal from objects in the target scene and deteriorates the signal-to-noise ratio for the detection of scene objects. Such extraneous light can also occur to be intense enough to cause detector saturation problems. As disturbing light sources the illumination systems of other similar laser scanner instruments play a particular role causing specific problems which are addressed separately below under b). Another special kind of disturbing background signal not stemming from a scene object is constituted by the diffuse scattering of the laser beam in the atmosphere due to fog, smoke, dust or swarms of insects, which is at the origin of problems of a particular kind treated below under point c). With the spatial selection in the image plane provided in this invention light from outside of a variable region of interest around the illuminated point can efficiently be separated from the light containing the relevant information and can thus be prevented to reach the detector. Consequently the optical aperture can be increased to improve signal strength.

Problem b): In several applications of three-dimensional scanners it is not uncommon that similar or identical scanner systems happen to illuminate the same target regions. This can lead to interference of two or more such systems with each other causing malfunctioning of the individual systems including complete failure or a high probability for erroneous results, unless appropriate precautions to avoid such interference are taken. By applying the method described here the probability for such interference events is already drastically reduced due to the increased spatial selectivity of the detection which is steered to follow only the actual illumination spot stemming from its own scanning system. In order to also ensure that interference does only occur in isolated events which can then be recognized and eliminated by software processing, the path taken by the illumination spot over the scene and/or the timing sequence of the illumination pulses have to differ from one system to the other. Here the use of random sequences to steer the beam pointing and/or pulse timing can give immunity to interference for pools of large numbers of similar scanner systems working on the same scene, apart from the rare and isolated events just mentioned.

Problem c): Situations of fog, smoke, dusty atmosphere, or swarms of small insects are generally problematic for scanner applications. Ideally objects in the scene would be correctly detected, as long as the atmosphere has sufficient transparency to allow for a signal level contribution from laser light scattered off a scene object which is well above the detection limit. Laser light diffusely scattered in the atmosphere before the scanning laser beam reaches the scene object, however, can contribute substantially to the total detected signal and hamper the correct detection of scene objects. With an analysis of the behaviour of the detected signal in time (time-of-flight spectrum) diffuse scattering from atmospheric particles can be distinguished from scattering off a scene object. Together with geometrical information, positioning and angles of the scanning laser beam with respect to the optical axis of the detection system, a region of interest in the image plane can then be derived by which the signal stemming from the scene object is isolated and can be measured with higher precision. In simpler procedures the selected region of interest is iteratively adapted in repeated measurements such that the signal stemming from a scene object can be gradually distinguished from scattering in the atmosphere.

It should be noted that in case the light path for detection coincides partially with that of the illumination light path, i.e. traverses a certain amount of optical elements in reverse of the illumination, a certain degree of spatial selectivity in the detection is already achieved. However, the optics for imaging the illuminated point on to the single detector in this case would have to achieve a high quality, near to diffraction limit imaging in order to reach the signal selectivity which this invention aims at. The invention proposes a solution which requires less a critical design of the optical system and can accordingly be less expensive. Furthermore the invention gives a larger design freedom for the detection system, enabling optimization of the light gathering ability independent of optical requirements related to the technical realization for the scanning of the laser beam. The additional flexibility in the way of separating signal light from background light enables useful enhancements of functionality.

It should be noted that the three-dimensional laser scanner instruments or systems in accordance with the present invention may be used in the automotive field, such as e.g. in scanner applications for car crash early alert-crash prevention, pedestrian protection, fog warning. When this kind of applications of three-dimensional scanners in automobiles will become more widespread, concepts that help to avoid interference between several scanners working on the same scene as proposed here will be of crucial importance. Other applications of the present invention may comprise machine vision and navigation applications, such as e.g. robots used in production, assembly, construction areas and mining; robots used for exploration or for recovery work in disaster areas, or surveillance and security applications under demanding conditions.

BRIEF DESCRIPTION OF THE DRAWINGS

Further details and advantages of the present invention will be apparent from the following detailed description of several not limiting embodiments with reference to the attached drawings, wherein.

DESCRIPTION OF PREFERRED EMBODIMENTS

The main aspect of the present invention concerns an additional component of the light detection system of a three-dimensional laser scanner providing performance and functionality enhancements. It mainly serves to improve the signal-to-noise ratio in detection and to block disturbing background and stray light from detection, the problem described under a) above. The invention also relates to some aspects of the design of the light detection system and of the scanner as a whole in order to accommodate the new component in the system and to obtain the enhanced performance and functionality. Further aspects of the invention relate to solutions to the problems of interference of similar scanner instruments working on the same scene described above under point b), and to solutions to problems of the scanner operation in bad atmospheric conditions addressed above under point c). The solutions proposed in the last two problem categories are for one part enabled by the device introduced in the main part of the invention, and for another part also realizable independently of this device.

We consider a three-dimensional laser scanner instrument with separate light pathways for the illumination of the object scene and the light detection system, since regarding performance the benefit of the invention is largest for instruments of this type.

A simple or more complex optical system, hereafter called imaging lens for simplicity, images the scene scanned by the illumination laser beam. In the image plane of the imaging lens a device selects a region of interest (ROI) of variable shape, size and position within the image plane. This device, hereafter called ROI-selection device, separates all light paths traversing the image plane inside of the ROI from those passing outside of the ROI. This is achieved either by selective transmission of the light passing within the ROI and absorption or reflection of the light hitting the image plane at points outside of the ROI, or by selective reflection of the light impinging on the device inside the ROI into a different direction than the light impinging outside the ROI is reflected into. The light passing the image plane inside the ROI is thus selected and can then be detected separately after possible further processing using imaging optics, optical filters or possibly an optical amplifier. The ROI-selection device is fully controlled by microprocessor or control electronics in order to reposition and adapt the selected ROI while the illumination beam scans the object scene such that mainly the illuminated spot is always captured within the ROI.

For the coordination between laser scan unit and the ROI selection the fixed geometrical relationship between the deflection angles used by the scan unit, the coordinates in the image plane of the imaged laser spot on a scene object and the distance between this object spot and the detection unit is used. To drive the ROI-selection device in this way the mentioned relationship is evaluated in the control unit which either drives also the scan unit or obtains the necessary information on the laser deflection angles actually used.

With only the deflection angles as information already a rather narrow rectangular or triangular region with a certain tilt angle and height can be specified in the image plane beyond which an image point of a laser spot on scene objects cannot lie. To further narrow the region around an image spot, information on the distance between the laser spot on the scene object and the imaging lens is required. With laser deflection angles given, the mapping of the three-dimensional scene on to the image plane is then completely determined. It can also be applied in reverse to obtain information on the distance between imaging lens and the illuminated point on the scene object by narrowing the ROI and closing in on the image spot. This is a kind of triangulation method and can be sufficiently accurate on short distances. In this sense the ROI-selection device adds the capability of being spatially selective to a single detector system without relying directly on the time-of-flight technique.

The precise expressions required for the coordination of the deflection angles used by the scan unit and the ROI-selection device depend on details of the actual geometry of the instrument's set-up. These could also be subject to small changes due to temperature changes, mechanical stress, vibration or shock. Hence, an automatic self-alignment and calibration capability of the instrument is very useful. Calibration requires precise information on the distance of imaging lens to the scene object hit by the laser spot, which is obtained from the time-of-flight measurement of the light backscattered by the scene object. Possible methods for automatic self-alignment, calibration and optimization of the signal-to-noise ratio are described below.

For the technical realization of the ROI-selection device several designs of transmissive and reflective nature using different technologies are possible. Three examples of possible designs are presented of which a first one of transmissive type will be described in more detail.

Figure 1:
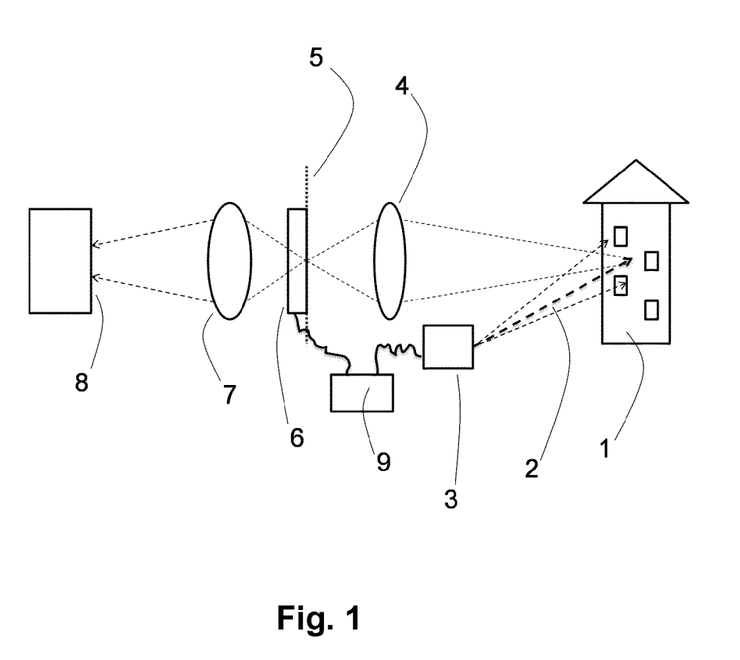
FIG. 1 shows a schematic view of a first embodiment of an ROI-selection device, which is transmissive for light in the selected ROI.
Figure 4:
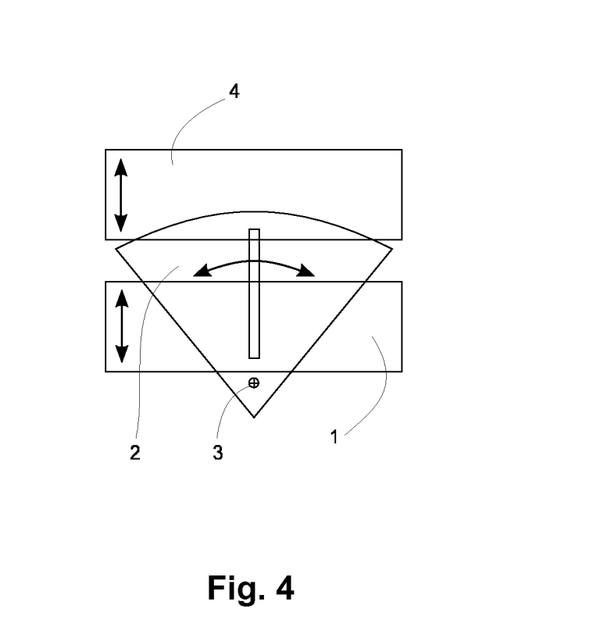
FIG. 4 shows an example of a set of simply shaped diaphragm blades.

The first example for a realization of the ROI-selection device is transmissive for light in the selected ROI. FIG. 1 gives a schematic drawing of a set-up of this type of design. The different reference numerals in FIG. 1 refer to the following features: 1 object scene; 2 scanning laser beam; 3 laser source and scan unit; 4 imaging lens; 5 image plane of imaging lens; 6 device transmitting the light inside of selected region of interest and blocking or reflecting light from outside of this region, e.g. a mechanical blade diaphragm device of which a possible design is sketched in FIG. 4, or a device providing selective transmission using liquid crystal technology; 7 auxiliary further optical treatment of selected light, e.g. further imaging optics, optical filters; 8 detector; 9 computerized control unit for coordination of the spatial laser scan and ROI-selection device.

The laser scan unit 3 emits laser pulses under varying angles such that a specified solid angle is scanned in which the scene is contained. The choice of the particular technique used to deflect the laser beam is not important for the present invention. It is however required that exact information on the actual deflection angles is either available in the common control unit for the laser scanning and the ROI-selection device, or that the scan unit can be controlled by the common control unit as to apply exact values for the deflection angles. Other parameters like laser pulse energy and duration, and the timing of the laser pulses can be available for control by the same common control unit.

The imaging lens 4 maps the scene onto the ROI-selection device which is located in the image plane. The particular design of the lens is not of importance for the invention, it can include any number of elements, lenses or curved mirrors. The light gathering ability of the imaging lens is a further aspect for which an optimization in the design is highly desirable, since it can improve the signal-to-noise ratio especially for long-range measurements where signal levels quickly become low with the typically limited laser pulse energies. Generally image quality requirements are not critical. Image distortion can easily be accounted for in the computerized control of the ROI-selection device. Chromatic aberrations are irrelevant as typically only a single wavelength is used for the illumination laser. Regarding focussing abilities and image sharpness, requirements depend on the particular scanner application, but will be low compared to photographic lens quality, since typically laser spot diameter and laser pointing accuracy are primarily determining the resolution of the scanner. Auto-focus systems similar to those used in consumer cameras can be used. In many applications a fixed focus design, with the focus set towards the end of the scanner's range, can be sufficient. In the imaging capability of the lens bad contrast as well as flare and ghosting should however be avoided, as the efficiency of main features of the invention, namely the signal-to-noise ratio increase and blocking of stray and background light could be deteriorated. The imaging lens can also be equipped with an image stabilization feature, as used in consumer cameras, based on accelerometers and position control of some optical elements within the lens set-up in order to prevent loss of resolution and errors due to vibration. Alternatively, the control loop for the image stabilization could also be closed by including this signal into the control of the ROI-selection device.

The ROI-selection device 6 is positioned in the image plane 5 of the imaging lens. As transmissive ROI-selection device, one could consider a realization using diaphragm blades with appropriately designed mechanical actuation similar in technology as used in photographic cameras. A drawing showing an example of simply shaped diaphragm blades for this purpose is given in FIG. 4. Legend for FIGS. 4: 1 and 4 are translatable diaphragm blades; 2 rotatable diaphragm blade with rectangular opening; 3 rotation axis of blade (2).

A diaphragm blade 2 with a narrow rectangular or triangular opening is mounted such that it is rotatable around an axis 3 with the angle controlled by a mechanical actuator. The location of the rotation axis 3 can be chosen such that by turning the diaphragm blade the image of the laser beam is always contained within the opening in the diaphragm. The rotation axis's position is determined by the geometrical arrangement of laser scan unit, the imaging lens and detection system. With the translatable diaphragm blades 1 and 4 a region along the laser beam axis can be selected. A mechanical diaphragm realization of the ROI-selection device has perfect transmission i.e. causes no additional loss of signal light in its open area. Such a realization bears however the drawbacks of causing noise, of mechanical wear, and of being relatively slow in operation. An algorithmic correction of lens distortion by the control unit of the ROI-selection device would also require more flexibility regarding the shape of the transmission area than the example shown in FIG. 4 offers. Mechanical designs allowing greater flexibility in the shape of the transmission area are conceivable, but will probably entail more complicated mechanical constructions.

A more attractive realization of a transmissive ROI-selection device is a design using liquid crystal (LC) technology. Liquid crystal display technology is widely spread in consumer electronics and IT equipment. In display panels the property of liquid crystal layers to change the polarization of light traversing them in dependence of the electric field is used. For this the LC layer is enclosed by two transparent electrodes of which at least one is structured in order to obtain the pixel structure of the panel. The thickness of the LC layer is chosen such that the rotation of the polarization of the transmitted light is up to 90° when the birefringence of the LC is switched with the electric field. Sandwiching this assembly between two polarizing films of orthogonal orientation realizes a separate optical switch for each pixel. Since our application does not require a grey scale capability, ferroelectric liquid crystals offer the advantageous properties of fast response times and of being bistable.

For our application the on-value transmittance of the LC panel should be as high as possible in order to keep losses of signal light low.

A drawback of an LC type realization of the ROI-selection device is that only one polarization direction of the signal light is left for detection.

Before presenting two possible realizations of a reflective ROI-selection device, some components of the transmissive design shown in FIG. 1 remain to be described. After the signal light is singled out for detection by the ROI-selection device, it has to be imaged on to the sensitive area of the light detector 8 by an auxiliary refractive or reflective optical system 7. Additionally a bandpass filter for the wavelength of the scan laser can be mounted in front of the detector. As light detector avalanche photodiodes (APDs), PIN photodiodes, mixed detectors APD/PIN or photomultiplier tubes (PMTs) can be used.

Figure 2:
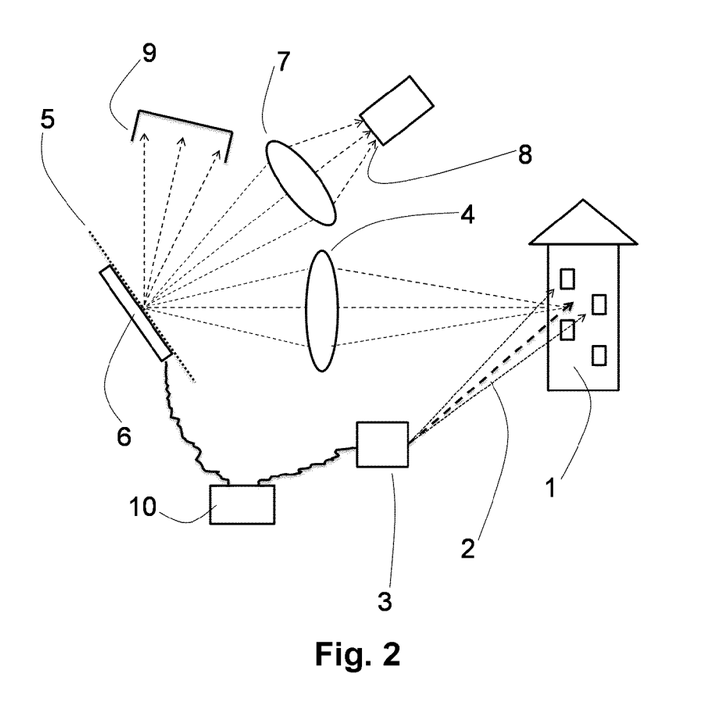
FIG. 2 shows an embodiment of the ROI-selection device of reflective type using DLP technology.

A realization of the ROI-selection device of reflective type using DLP technology is shown in FIG. 2. DLP (digital light processor) technology is based on an array of micromechanical mirrors which are individually addressable and can be switched in position using the electrostatic force.

Legend of FIG. 2: 1 object scene; 2 scanning laser beam; 3 laser source and scan unit; 4 imaging lens; 5 image plane of imaging; 6 device based on DLP technology reflecting the light inside of the selected region of interest in a particular direction; 7 auxiliary further optical treatment of selected light, e.g. further imaging optics, optical filters; 8 detector; 9 optical beam dump for the light outside of selected ROI which is reflected in a second particular direction by the DLP device; 10 computerized control unit for coordination of the spatial laser scan and ROI-selection device.

Typical tilt angles of the microscopic mirrors between off- and on-state are around 10°, which is sufficient to realize a ROI-selection device. Placing the DLP device 6 in the image plane 5 of the imaging lens 4, the microscopic mirrors reflect the light in their on-state in the direction of an auxiliary optical system which images on to the detector's sensitive surface 8. When they are switched to the off-state the microscopic mirrors deflect the light into an optical beam dump where it is absorbed.

Figure 3:
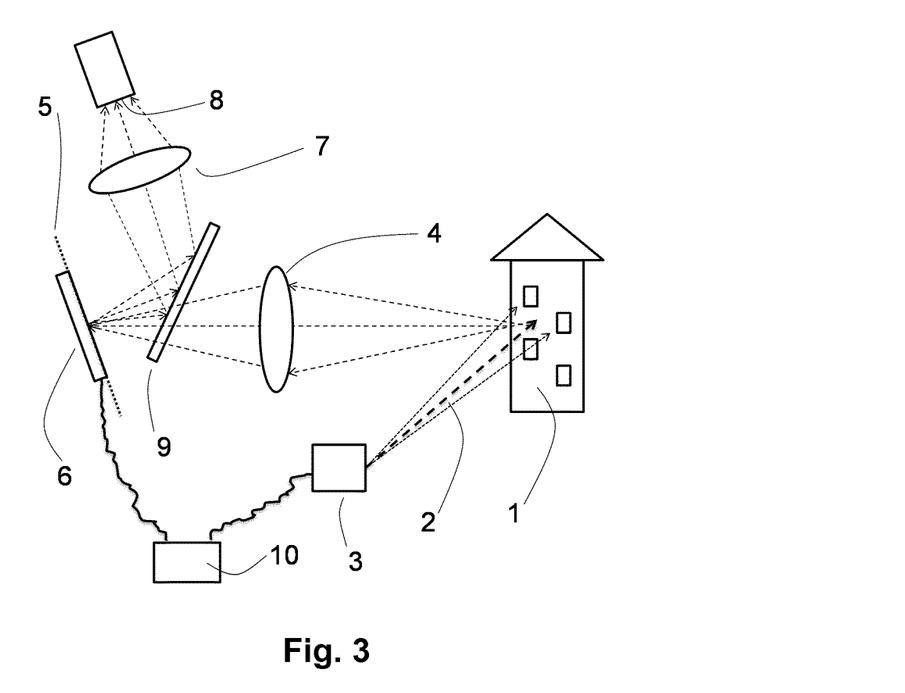
FIG. 3 shows a schematic set-up using a LCoS panel for the ROI-selection device.

A further realization of the ROI-selection device of reflective type can be conceived using LCoS (liquid crystal on silicon) technology. The technique of LCoS panels has similarities with transmissive LC panels. Again the light polarization is changed but this time on reflection at the LCoS device. The effect of each pixel of the LCoS is that of a switchable phase plate in front of a mirror, with the difference in birefringence of the LC layer between on- and off-state a phase shift between two orthogonal directions of polarization corresponding, for example, to that of a quarter wave plate is realized. FIG. 3 shows a schematic set-up using a LCoS panel 6 for the ROI-selection device. Legend of FIG. 3: 1 object scene; 2 scanning laser beam; 3 laser source and scan unit; 4 imaging lens; 5 image plane of imaging lens; 6 device based on LCoS technology reflecting the light inside of selected region of interest with an additional phase shift of 90° between two orthogonal directions of polarization; 7 auxiliary further optical treatment of selected light, e.g. further imaging optics, optical filters; 8 detector; 9 Polarizing beam splitter; 10 computerized control unit for coordination of the spatial laser scan and ROI selection device.

The LCoS panel 6 is positioned in the image plane 5 of the imaging lens 4. In order to single out the light selected for detection after reflection by the LCoS panel a polarizing beam splitter 9 is placed between imaging lens and LCoS panel. The polarizing beam splitter transmits only one kind of linearly polarized light and reflects the other kind. Pixels of the LCoS panel in the on-state reflect light with the polarization rotated by 90°, such that it is deflected by the polarizing beam splitter in direction of the auxiliary optical system 7 focusing onto the active area of the detector 8.

Methods of Alignment, Calibration and Optimization of Signal-to-Noise Ratio

The geometrical relationship governing the coordination of the ROI-selection device with the drive of the illumination beam deflection angles in the scan unit depends on the details of the actual geometry of the scanner construction. In many applications the instrument is exposed to temperature changes, mechanical stress, vibration and chock, such that frequent alignment and calibration of the system is required even when passively stable and mechanically rigid designs are used. An automatic self-alignment and calibration capability of the instrument together with an active vibration control technology is very useful and for demanding applications highly recommended.

To a large extend geometry changes in the set-up of the instrument due to vibration can be compensated using a similar active vibration control technique as is used for example in photographic and video cameras. At the relevant locations within the instrument accelerometers measure the static and dynamic acceleration in different directions from which control signals for the actuators of different optical components are derived, such that the effect of vibrations and mechanical stress on the geometry of the instrument is minimized. The actuated optical components used for control can be mirrors and lenses. The optical systems are designed accordingly to allow for an efficient control of vibration and static acceleration in this way. In addition or alternatively the control signal from the accelerometers can be evaluated in the unit controlling the ROI-selection device in order to account at this level for changes in the position of elements in the detection system as well as changes in angles or position of the illumination beam emitted from the scan unit.

For the calibration of the ROI-selection device with respect to the illumination scan unit, one can always view the control of both devices as working in a coordinate system related to the device. For the ROI-selection device this is the coordinate system of its active surface in the image plane of the imaging lens. In the example of a realization using an LC panel the indices of pixels in the panel represent a practical coordinate system. In the case of the scan unit the control has to use a coordinate system mapping the two deflection angles for the illumination beam, i.e. a horizontal and a vertical deflection angle. The calibration comprises three levels: First, the possible shifts in the origins of the two respective coordinate systems, corresponding to horizontal and vertical displacements of elements of the imaging lens or other parts of the detection system with respect to the emission point of the scan unit, or changes in the pointing direction of the scan unit with respect to the optical axis of the imaging lens. Second, changes in the respective scales of each coordinate system, which could be caused by changes in the magnification of the imaging lens, i.e. by displacements along the optical axis of elements of the imaging lens or the ROI-selection device, or by changes in the amplitude of the response of the device deflecting the illumination beam in the scan unit. And third, a possible rotation angle between the two coordinate systems, which reflects, for example, possible changes in the tilt angle of the scan unit with respect to the detection system in the plane orthogonal to the optical axis of the imaging lens.

The geometric relationship mapping illuminated points in the three-dimensional scene to points in the image plane of the imaging lens is represented in the computerized control unit of the ROI-selection device by corresponding computable expressions with parameters characterizing the details of the instruments geometry, i.e. distances and angles, and possibly response calibration factors for the device realizing the illumination beam deflection or the magnification of the imaging lens. The values of these parameters are adapted in the calibration procedure in order to correct for the changes as they occur for reasons of temperature changes, mechanical stress, vibration and chocks or wear and ageing of the system. The calibration requires precise information on the distance of the detector to the scene object hit by the laser spot, which is obtained from the time-of-flight measurement of the light backscattered by the scene object. The information on deflection angles used is either provided by the scan unit, or set to specified values by the control unit. To find the precise location in the image plane of the imaged laser spot in the three-dimensional scene iterative search procedures can be used by which the location of the ROI is adapted in order to optimize the detector signal level, starting with a larger diameter of the ROI and then decreasing it. Methods using types of segmented photo-detectors, e.g. quadrant photo-detectors, to obtain the position information are also conceivable. For the calibration at all three levels several measurement points spread over the three-dimensional scene are necessary. The calibration can be executed on defined events like on request by the operator, at powering up of the instrument, periodically after a certain time period elapsed or when a certain temperature change occurred. For demanding applications it can also be practical to have the calibration procedures run permanently in parallel to the actual measurement of the three-dimensional scene. Here auto-adaptive, self-learning, or predictive procedures are conceivable which use optimized strategies for calibration by prioritizing calibration of parameters most likely to change and recognizing trends in the change of certain parameters.

In addition, adaptive procedures are thinkable for optimization of the signal-to-noise ratio of the detected signal by acting on the laser pulse energy as well as the size and shape of the ROI selection.

Solution to Problems from Category b): Method to Avoid Interference Between Several Similar Scanner Systems Working on the Same Scene With the introduction of the ROI-selection device in the image plane the detection can be made selective such that only light from the spot in the three-dimensional scene illuminated by the systems own laser is reaching the detector. Due to this restriction of the detection to a small fraction of the field of view, the probability for simultaneous detection of illumination light stemming from another similar instrument working on the same scene is already greatly reduced as compared to a detection system which is sensitive to a larger than necessary fraction of the field of view of the detector. This probability reduces to that for an overlap of the illumination spots of two instruments in the same point of the three-dimensional scene times the probability for a coincidence of illumination pulse in time. The probability for such disturbing double coincidence in time and in space can be further reduced by using shorter laser pulse durations. To further ensure that such rare coincidence can only occur in isolated events, a diversification of the illumination pulse timing and/or of the path the illumination point is steered along over the scene has to be introduced. An efficient way to achieve diversification consists in using random sequences for the illumination pulse timing and/or for the steering of the laser spot through the scene. Pseudo-random number generators can be used for this purpose and provide enough randomness, in particular when a large enough period is used and an additional true randomness is introduced in the choice of the seed numbers.

Solution to Problems in Category c): Methods for the Measurement of the Visibility Range, and for Improved Detection of Objects in Bad Atmospheric Conditions It is well known that the signal contribution from diffuse scattering off particles in the atmosphere is reduced when the axes for detection and illumination are well separated. This is also the configuration where the ROI-selection device in the image plane is most useful. In the situation of reduced visibility due to bad atmospheric conditions, fog, or smoke, dust or swarms of insects, the ROI-selection device can enable additional functionality and improve functionality provided by the exploitation of the time-of-flight technique to characterize the visibility range as well as to improve detection of objects in an atmosphere with reduced visibility.

Figure 5:
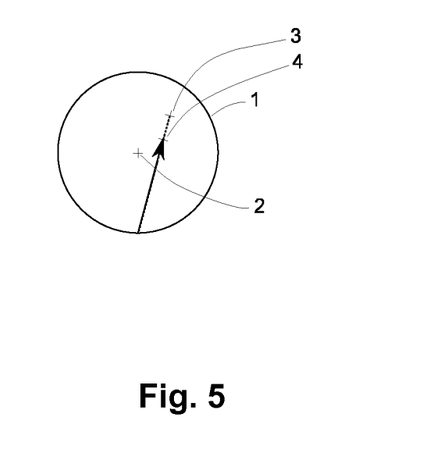
FIG. 5 illustrates the propagation of the laser beam through the atmosphere.

When the laser deflection angles are set such that the path of the laser beam remains entirely within the field of view of the imaging lens and no scene objects are hit by the laser beam, a determination of the visibility range is in principle possible just from perspective geometry based on an evaluation of the image of the trace of the laser beam due to light scattering in the atmosphere. The image of the propagation of the laser beam through the atmosphere corresponds to a line segment as schematically shown in FIG. 5. The starting point of the line segment is determined by the location where the beam enters the field of view of the lens delimited by the circle 1 in the image plane. The end point of the line segment 4 corresponds to the point in the scene, which is furthest away and delivers a signal level from atmospheric scattering just above the detection limit. The location of this end point thus determines the visibility range. With longer visibility range this point approaches the convergence point 3 in FIG. 5 which corresponds to the point in the scene in infinite distance to which the laser beam is pointing to.

Legend of FIG. 5: 1 image circle of field of view of imaging lens; 2 center of field of view; 3 convergence point for laser beam propagating to very large or infinite distance; 4 point where signal level from light scattered in the atmosphere is decreased to detection limit.

With this method relying on triangulation the accuracy of the determination of the distance from the imaging lens decreases rapidly with increasing distance. This is due to the vanishing slope of the function mapping points from the three-dimensional scene to the image plane for large distances. Thus the primitive method relying only on considerations of perspective is merely practical in cases of short range visibilities.

For an accurate determination of the visibility range the time-of-flight (TOF) spectrum of the backscattered light signal has to be evaluated. To record the TOF spectrum several methods are known and commonly used in various technological and scientific applications involving timing of short pulses, for example in particle physics experiments. As an example for such a method one can process the signal from the fast light detector, APD or PMT, in a time-to-digital converter, whereby each detector pulse becomes labelled with a time stamp related to the time of detection. This requires a sufficiently short dead time of the detector between two pulses. Other methods of this kind use a multichannel scaler or a time-to-amplitude converter in combination with a multichannel buffer. When PIN photo-detectors are used or APDs in the linear mode of operation, the analogue signal obtained can be processed using fast ADCs and sampling at sufficiently high rates by circuits similar to those used in digital sampling oscilloscopes. A technologically less involved method consists in using a time-gated detection. Here the detector is only active within a short time interval with an adjustable delay after a trigger pulse, or the detector signal is integrated over only this short time interval with adjustable delay. The TOF spectrum is recorded by varying the delay of the gate for the detection in repeated measurements.

Figure 6:
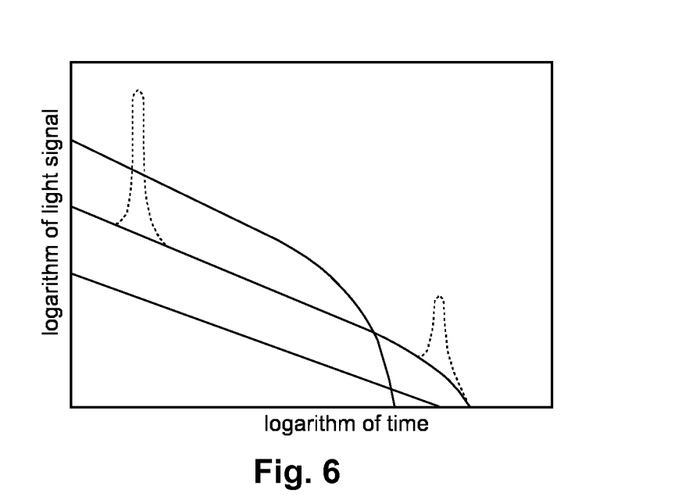
FIG. 6 shows the TOF signals after a short laser pulse as expected in three atmospheres with different visibility range.

FIG. 6 shows the TOF signals after a short laser pulse as expected in three atmospheres with different visibility range.

The curves drawn with a solid line represent the time dependence of the detected signal from light diffusely scattered in the atmosphere for three different values of the visibility range. The signal at shorter times is highest for the shortest visibility range. Curves drawn with dashed lines show the detector signals of backscattering from a hard object located once in smaller and once in larger distance in an atmosphere allowing a medium visibility. The signals from hard objects overlay the signal received from diffuse scattering in the atmosphere.

From the level and shape of the signal in the measured TOF curves the visibility range can be accurately determined. In the TOF spectrum the signals from scattering off hard objects in the scene appear as sharp features with a width corresponding essentially to the pulse duration for the illumination. The background signal from diffuse scattering in the atmosphere at shorter range can be orders of magnitude larger than the signal from a hard object in larger distance. In the time-resolved measurement the two types of signal sources can be unambiguously distinguished by their respective characteristic shape. With increasing distance and with decreasing visibility range the signal strength of backscattering from hard objects decreases and accordingly the contrast with the background of diffuse scattering diminishes and eventually vanishes. Software processing of the TOF-spectrum can allow for an improved detection and localization of objects in the scene in situations of reduced visibility.

Depending on the type of photo-detector used, the large signal levels from diffuse scattering in the atmosphere at shorter range, i.e. at shorter times in the TOF spectrum, can cause detector saturation problems hampering proper detection of signals at later times. As a remedy the laser pulse energy can be reduced or if a variable gain for the detector or the subsequent amplifier is provided this could be adapted, such that, for example, the shape and signal level for diffuse scattering in the atmosphere can be measured accurately. To detect the weak signals from objects in a larger distance, however, a large laser pulse energy as well as high detection gain is required. The dynamic range of the detection system or the speed of a controlled adaptation of it can be insufficient to allow the unambiguous detection of distant scene objects in a diffusely scattering atmosphere. In these cases the capability provided by the present invention to select a ROI and block geometrically all light outside this ROI from detection is very useful. After a first measurement with reduced sensitivity to obtain an overview over the whole range, the ROI-selection device can be programmed to eliminate the strong signal from diffuse scattering at short range and allowing in a second measurement with large pulse energy and high gain of the detector system an accurate detection of objects in larger distance.

The invention claimed is:
1. A three-dimensional laser scanner instrument for acquiring three-dimensional geometric data of a scene, said three-dimensional laser scanner instrument comprising an illumination system for generating a light beam and for scanning an illumination point of said light beam through said scene, a light detection system comprising at least one light detector, said light detection system being arranged to receive light from said scene, and an optical system for imaging light scattered in or reflected from said scene onto said light detection system;

characterized in that light detection system comprises a controllable filter element for dynamically discriminating light impinging from selected regions of said scene and a control unit operatively connected to said controllable filter element and to said illumination system, wherein in operation of said scanner instrument, said filter element is controlled by said control unit so as to guide only light impinging from a selected, spatially delimited region around said illumination point in said scene onto said at least one light detector.

2. The three-dimensional laser scanner instrument according to claim 1, wherein a size and/or a shape of said selected, spatially delimited region around said illumination point is dynamically adjustable.

3. The three-dimensional laser scanner instrument according to claim 1, wherein said filter element is arranged geometrically in or close to an imaging plane of said optical system.

4. The three-dimensional laser scanner instrument according to claim 1, wherein said light beam is projected onto said scene along a first optical pathway and wherein said light scattered in or reflected from said scene is imaged onto said light detection system along a second optical pathway, and wherein said first pathway and said second pathway are separate from each other.

5. The three-dimensional laser scanner instrument according to claim 1, wherein said controllable filter element comprises one or more mechanical diaphragm blade(s) of appropriate shape(s), said one or more mechanical diaphragm blade(s) being provided with an electronically controlled mechanical actuation device.

6. The three-dimensional laser scanner instrument according to claim 1, wherein said controllable filter element comprises at least one liquid crystal panel, said liquid crystal panel comprising an array of individually controllable pixels to control blocking and transmission of light in different areas of said panel.

7. The three-dimensional laser scanner instrument according to claim 1, wherein said controllable filter element comprises at least one panel based on LCoS (liquid crystal on silicon) technology comprising an array of individually controllable pixels and a polarization selective optical element.

8. The three-dimensional laser scanner instrument according to claim 7, wherein said polarization selective optical element comprises a polarization beam splitter.

9. The three-dimensional laser scanner instrument according to claim 1, wherein said controllable filter element comprises an array of micromechanical mirrors, said micromechanical mirrors being arranged and configured such that the orientation of said micromechanical mirrors with respect to the image plane can be individually switched.

10. The three-dimensional laser scanner instrument according to claim 1, further comprising a calibration mechanism configured and adapted to calibrate and align the controllable filter element with the light beam generated by said illumination system.

11. Method for operating a three-dimensional laser scanner instrument, said three-dimensional laser scanner instrument comprising an illumination system for generating a light beam and for scanning an illumination point of said light beam through said scene, a light detection system comprising at least one light detector, said light detection system being arranged to receive light from said scene, and an optical system for imaging light scattered in or reflected from said scene onto said light detection system, said method comprising the steps of dynamically discriminating light impinging from selected regions of said scene by means of controllable filter element by controlling said filter element so as to guide only light impinging from a selected, spatially delimited region around said illumination point in said scene onto said at least one light detector.

12. Method for operating a three-dimensional laser scanner instrument according to claim 11, wherein said controllable filter element is controlled for blocking of return light signal from atmospheric scattering at short range during the operation of the instrument under bad atmospheric conditions.

13. Method for operating a three-dimensional laser scanner instrument according to claim 12, wherein the visibility range in bad atmospheric conditions is determined based on an evaluation of a light intensity distribution in the image of the trace of the laser beam due to light scattering in the atmosphere.

* * * * *